(12) United States Patent
Fisher

(10) Patent No.: US 7,597,488 B2
(45) Date of Patent: Oct. 6, 2009

(54) OPTICAL ASSEMBLY

(75) Inventor: John J. Fisher, Blacksburg, VA (US)

(73) Assignee: Nuvotronics LLC, Radford, VA (US)

( * ) Notice: Subject to any disclaimer, the term of this patent is extended or adjusted under 35 U.S.C. 154(b) by 36 days.

(21) Appl. No.: 11/445,043

(22) Filed: Jun. 1, 2006

(65) Prior Publication Data

US 2007/0081770 A1 Apr. 12, 2007

Related U.S. Application Data

(60) Provisional application No. 60/686,543, filed on Jun. 1, 2005.

(51) Int. Cl.
*G02B 6/36* (2006.01)
(52) U.S. Cl. .......................... 385/94; 385/91
(58) Field of Classification Search .............. 257/13, 257/79–103, 466, 499–564, 918; 361/748; 385/14–94
See application file for complete search history.

(56) References Cited

U.S. PATENT DOCUMENTS

| | | | | |
|---|---|---|---|---|
| 4,969,179 A * | 11/1990 | Kanare et al. | .............. | 379/33 |
| 5,515,469 A * | 5/1996 | Zarem et al. | .............. | 385/92 |
| 5,596,663 A * | 1/1997 | Ishibashi et al. | .............. | 385/92 |
| 5,596,665 A * | 1/1997 | Kurashima et al. | .............. | 385/92 |
| 6,269,789 B1 * | 8/2001 | Abe et al. | .............. | 123/294 |
| 6,284,563 B1 | 9/2001 | Fjelstad | | |
| 6,290,402 B1 * | 9/2001 | Shishikura et al. | .............. | 385/88 |
| 6,318,902 B1 * | 11/2001 | Igl et al. | .............. | 385/59 |
| 6,358,066 B1 * | 3/2002 | Gilliland et al. | .............. | 439/76.1 |
| 6,632,027 B1 * | 10/2003 | Yoshida et al. | .............. | 385/88 |
| 6,808,317 B2 * | 10/2004 | Cheng et al. | .............. | 385/89 |
| 6,821,031 B2 * | 11/2004 | Loch et al. | .............. | 385/92 |
| 6,862,184 B2 * | 3/2005 | Shi et al. | .............. | 361/719 |
| 6,866,426 B1 * | 3/2005 | Steinberg et al. | .............. | 385/83 |
| 2002/0094177 A1 * | 7/2002 | Horio | .............. | 385/94 |
| 2002/0191910 A1 * | 12/2002 | Gallup et al. | .............. | 385/33 |
| 2003/0031426 A1 * | 2/2003 | Nakanishi et al. | .............. | 385/78 |
| 2003/0053762 A1 * | 3/2003 | Cheng et al. | .............. | 385/88 |
| 2003/0107874 A1 * | 6/2003 | Feigenbaum et al. | .............. | 361/704 |
| 2003/0113071 A1 * | 6/2003 | Kim et al. | .............. | 385/76 |
| 2003/0118293 A1 * | 6/2003 | Canace et al. | .............. | 385/92 |
| 2003/0161026 A1 * | 8/2003 | Qin et al. | .............. | 359/281 |
| 2004/0151441 A1 * | 8/2004 | Bennett et al. | .............. | 385/92 |
| 2004/0208459 A1 * | 10/2004 | Mizue et al. | .............. | 385/92 |
| 2004/0240497 A1 * | 12/2004 | Oomori | .............. | 372/36 |
| 2004/0264866 A1 * | 12/2004 | Sherrer et al. | .............. | 385/49 |
| 2005/0018978 A1 * | 1/2005 | Nevo et al. | .............. | 385/92 |
| 2005/0041932 A1 * | 2/2005 | Benzoni et al. | .............. | 385/88 |
| 2005/0089280 A1 * | 4/2005 | Kumar et al. | .............. | 385/88 |
| 2005/0110157 A1 * | 5/2005 | Sherrer et al. | .............. | 257/776 |
| 2005/0111797 A1 * | 5/2005 | Sherrer et al. | .............. | 385/93 |

OTHER PUBLICATIONS

European Search Report of Corresponding European Patent Application No. 06 25 2810 mailed Sep. 21, 2006.

* cited by examiner

*Primary Examiner*—Frank G Font
*Assistant Examiner*—Peter Radkowski
(74) *Attorney, Agent, or Firm*—Sherr & Vaughn, PLLC

(57) ABSTRACT

Provided are optical assemblies which allow for optical and mechanical connection between an optical bench and an optical fiber connector. The invention finds particular applicability in the optoelectronics industry in forming micro-optical components.

11 Claims, 4 Drawing Sheets

OPTICAL ASSEMBLY

This application claims the benefit of priority under 35 U.S.C. § 119(e) to U.S. Provisional Application No. 60/686,543, filed Jun. 1, 2005, the entire contents of which are incorporated herein by reference.

The present invention relates generally to the field of optoelectronics. In particular, the present invention relates to optical assemblies which allow for optical and mechanical connection between an optical bench and optical fiber connector. The invention finds particular applicability to the manufacture of a micro-optical component assembly which includes a housing for an optoelctronic subassembly such as a transmitter, receiver or transceiver optical subassembly, and which can be connected with an optical fiber connector.

Optoelectronic devices such as lasers and photodetectors are used for a variety of applications, for example, in the telecommunications industry. Existing commercial transmitter optical subassemblies (TOSAs) are manufactured using a process based on a TO-can header assembly containing a laser diode and monitor diode. A typical TO-can type package is described, for example, in U.S. Patent Application Publication No. US 2004/0240497 A1. The header assembly also has an optically transparent window or lens, allowing an optical signal to pass to or from the optoelectronic device. In order to focus the laser light into an optical fiber ferrule, conventional TO-can TOSA packages incorporate a variety of cylindrical machined subcomponents which must be aligned with each other, and welded or bonded in place. At least two separate alignment and welding or bonding steps are required for such a package. In devices requiring an optical isolator, further alignment and welding or bonding is required. In fabricating a conventional TO-can TOSA package, costly tooling in the form of laser welding or bonding systems is required. In addition, TO-can packages are generally not well suited for packaging of planar-type device structures such as silicon optical bench.

It would therefore be beneficial to provide an optical assembly in which the number of components, alignment steps and welding or bonding steps is reduced. For example, it would be desirable to reduce the number of alignment and welding or bonding steps to a single alignment and welding or bonding step. As a result, significant cost savings in materials, labor and tooling over conventional optical assemblies could be attained. It would also be desirable to provide an optical assembly which would be suitable for use with silicon optical bench structures.

In accordance with a first aspect of the invention, an optical assembly is provided. The optical assembly includes: an optical bench comprising an optoelectronic component affixed to a substrate; a housing in which the optical bench is disposed, the housing comprising a first mating region; an optical ferrule receptacle for optically coupling the optical bench with an optical fiber, the optical ferrule receptacle comprising a second mating region, wherein the housing and the optical ferrule receptacle are mated with each other at the first and second mating regions; and a flex circuit attached to the optical bench wherein the flex circuit is disposed in contact with an interior surface of the housing for relieving strain in the flex circuit.

As used herein, the terms "a" and "an" are inclusive of "one or more". The term "on" and "over" are used interchangeably in defining spatial relationships, and encompass the presence or absence of intervening layers or structures. Also as used herein, the term "optical assembly" encompasses structures having optical and/or optoelectronic functionality.

The present invention will be discussed with reference to the following drawings, in which like reference numerals denote like features, and in which.

Figure 1:
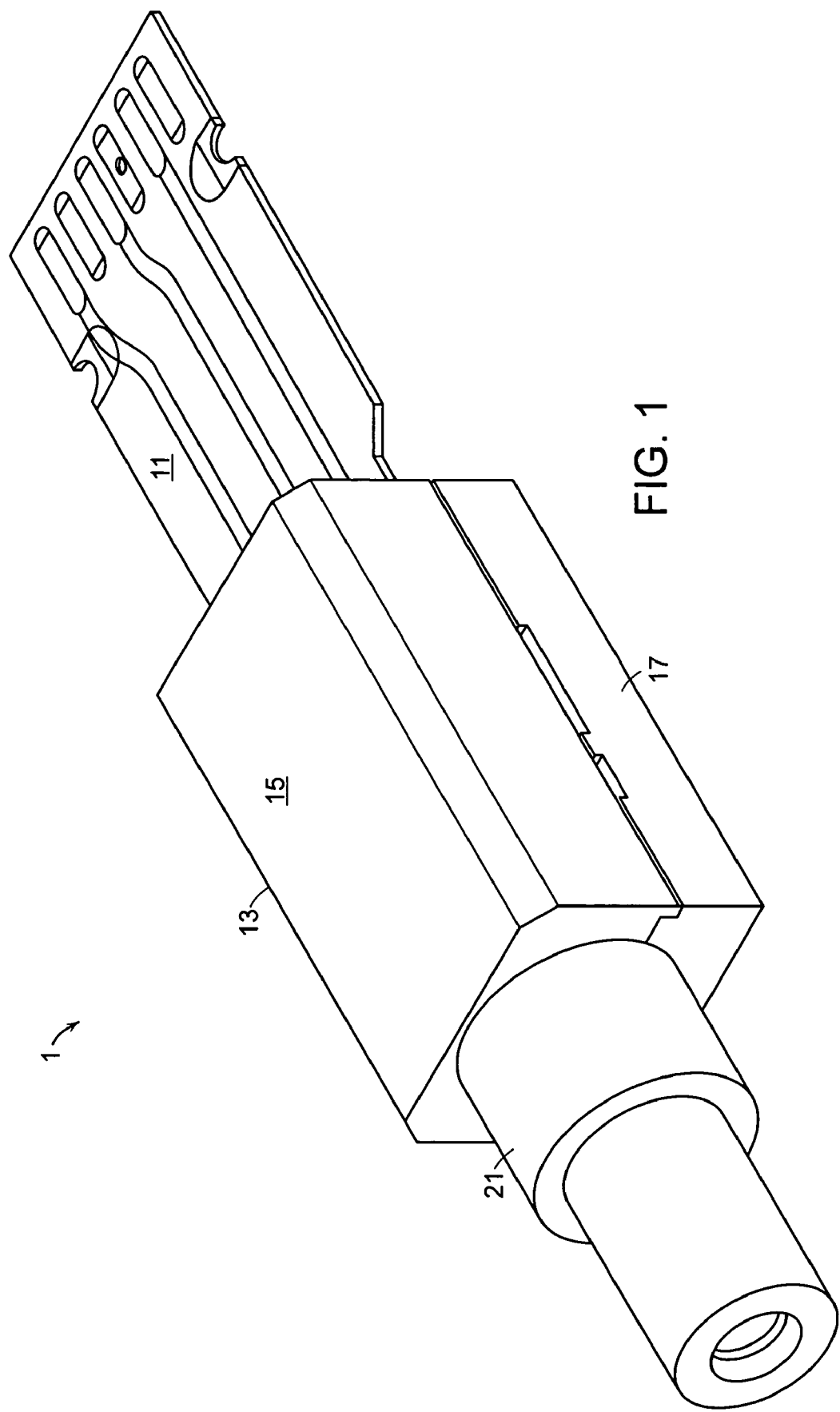
FIG. 1 illustrates an exemplary optical assembly in accordance with the invention.
Figure 2:
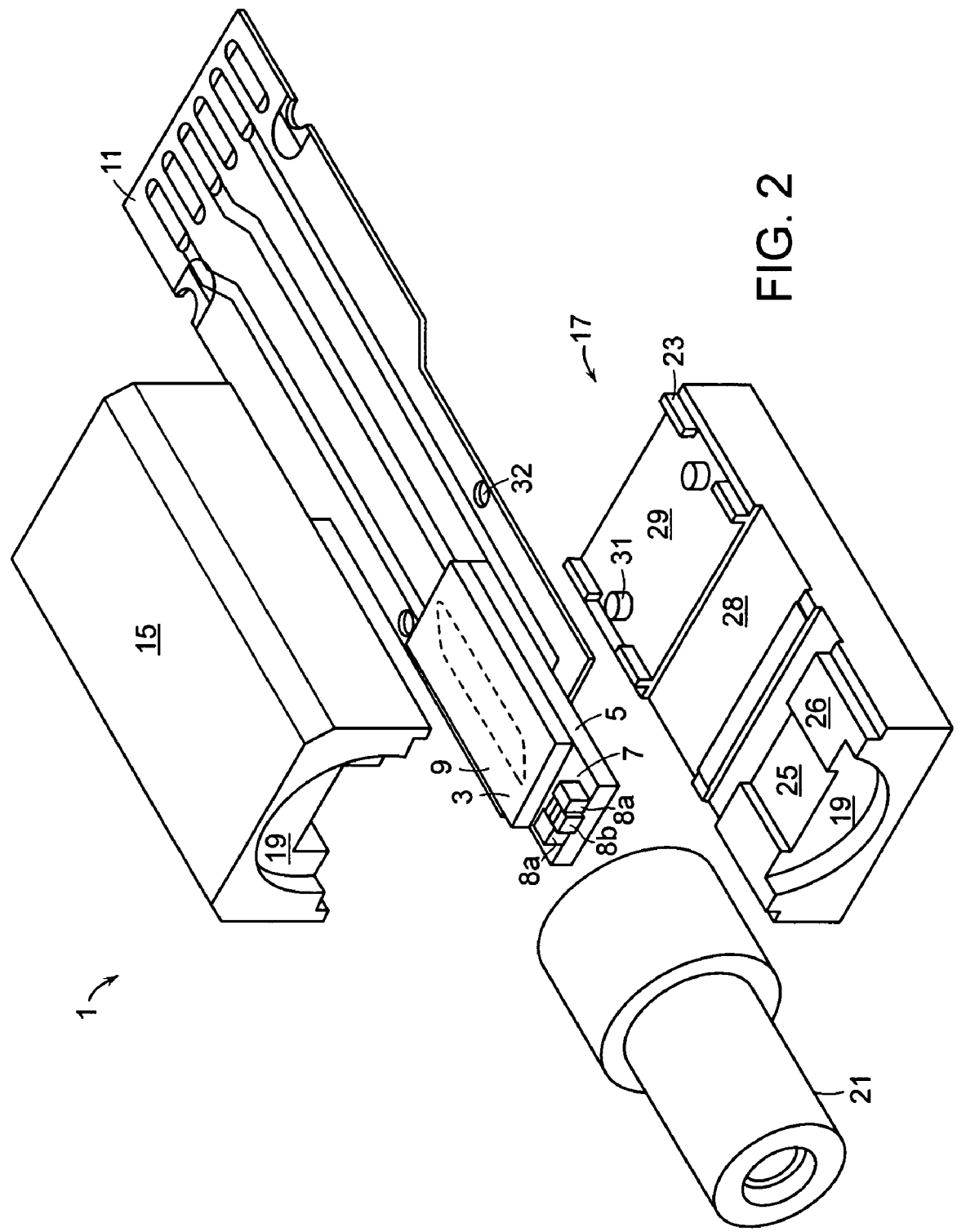
FIG. 2 illustrates a first exploded view of the optical assembly shown in FIG. 1.
Figure 3:
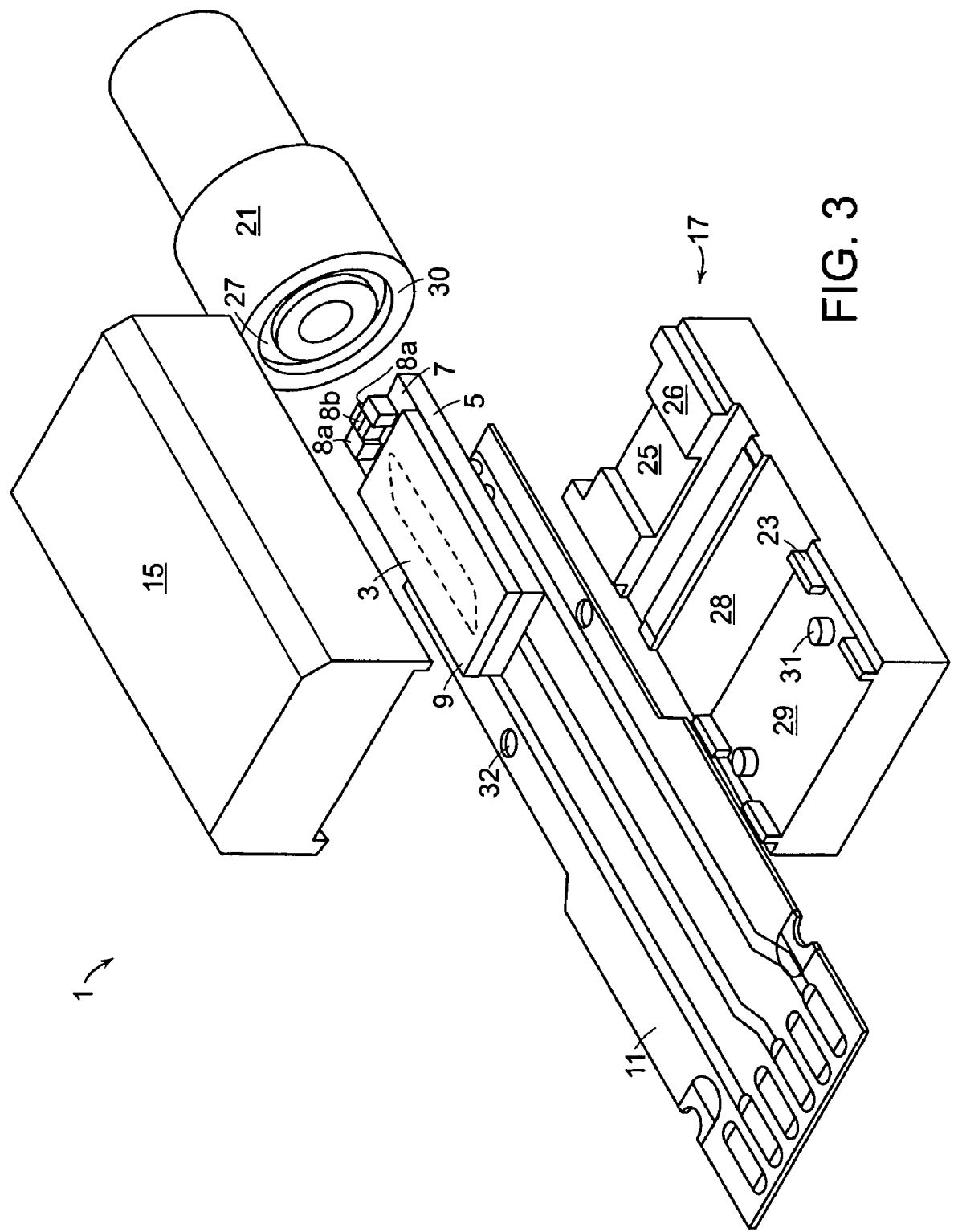
FIG. 3 illustrates a second exploded view of the optical assembly shown in FIG. 1 from a direction opposite that shown in FIG. 2.

The present invention will now be described with reference to FIGS. 1-3, depicting an exemplary optical assembly 1 in accordance with the present invention. The optical assembly includes an optical bench 3. The optical bench includes a substrate 5 having an upper surface 7 in/on which various surface features are formed. The substrate 5 is typically formed from a semiconductor material which may be in wafer or chip form, such as silicon, for example, <100> single-crystal-silicon, gallium arsenide, indium phosphide, or lithium niobate, or from a ceramic, polymer, or metal. One or more optical and/or optoelectronic components are bonded to the substrate upper surface 7. Typical optical components include, for example, optical fibers, lenses such as ball lenses, filters, and optical isolators. The exemplified optical isolator includes permanent magnets 8a and garnet crystal 8b. Typical optoelectronic devices include, for example, laser die and photodetectors. The optical and optoelectronic components of the optical bench are shown generally as a dashed line in the illustrations.

The substrate upper surface 7 includes one or more surface features formed therein or on for holding the various components. The surface features may include, for example, grooves such as V- or U-groove for holding an optical fiber, pits for holding lenses such as a ball lens, and metal features for electrical connection of the optoelectronic device. Typical metal features include, for example, contact pads to which the optoelectronic device is soldered, metal lines and bonding pads for connection to a power supply. Techniques for forming surface features are known to those skilled in the art. For example, grooves and pits may be formed using masking and wet and/or dry etching techniques, while metallization structures may be formed by sputtering, evaporation or plating techniques. These techniques may optionally be used to form a substrate master from which substrates may be formed in a molding process. A lid 9 may further be provided for the optical bench for forming a hermetically enclosed volume for the components.

Electrical connection to the optical bench 3 may be accomplished by any known means. In the exemplified embodiment, a flex circuit 11 is provided for this purpose. Bonding pads (not shown) of the flex circuit 11 are soldered to corresponding bonding pads on the underside of the optical bench 3, which in turn are electrically connected to the optoelectronic device of the optical bench.

A housing 13 for the optical bench provides one or more functions including, for example, alignment when assembling the optical assembly, heat sinking to remove unwanted heat generated by the optoelectronic device, strain relief to relieve stress from the flex circuit, mechanical protection for the optical bench, mounting capability to a printed circuit board or other electronic substrate, and thermal isolation to prevent solder reflow in earlier-formed solder joints during later soldering processes. The optical bench housing 13 may be constructed, for example, of machined, molded or stamped metal or plastic, including thermally conductive plastic. The optical bench housing may be formed of a plurality of pieces as in the embodiment shown in FIGS. 1-3. In the exemplified embodiment, the housing includes an upper portion 15 and lower portion 17. The housing includes an alignment hole 19 for receiving an optical ferrule receptacle 21. In accordance with one embodiment of the invention, when connected together, a symmetrical relationship between the housing and optical ferrule receptacle mating portions is created. The housing parts may include surface features which allow for passive alignment between the housing parts and between the housing parts and other components. For example, alignment pins 23 may be provided for passively locating flex circuit 11. A trench 25 and elevated regions 26 in the lower housing portion 13 for passively locating the optical bench 3 may be provided.

The flex circuit 11 is in contact with the lower housing portion 17. A relief trench 28 may be provided in this section for providing an air gap between the flex circuit and lower housing portion. This air gap acts as a thermal stop to protect solder joints formed between the flex circuit and optical bench 3 from reflowing when subsequently soldering the optical bench to the housing. The lower and/or upper housing portions 17, 15 may further include a strain relief land surface 29 for relieving strain in the flex circuit 11. As the housing upper and lower portions 15, 17 are assembled, surfaces 29 contact the flex circuit, providing strain relief for the flex circuit. Pins 31 shown protruding from the land surface 29 may be provided for mating with holes 32 in the flex circuit to provide an optional additional registration. Compliant materials such as foams or adhesives may also be added on relief land surface 29 and/or on the flex circuit 11 to sandwich and support the flex circuit as it exits the housing 13.

Figure 4:
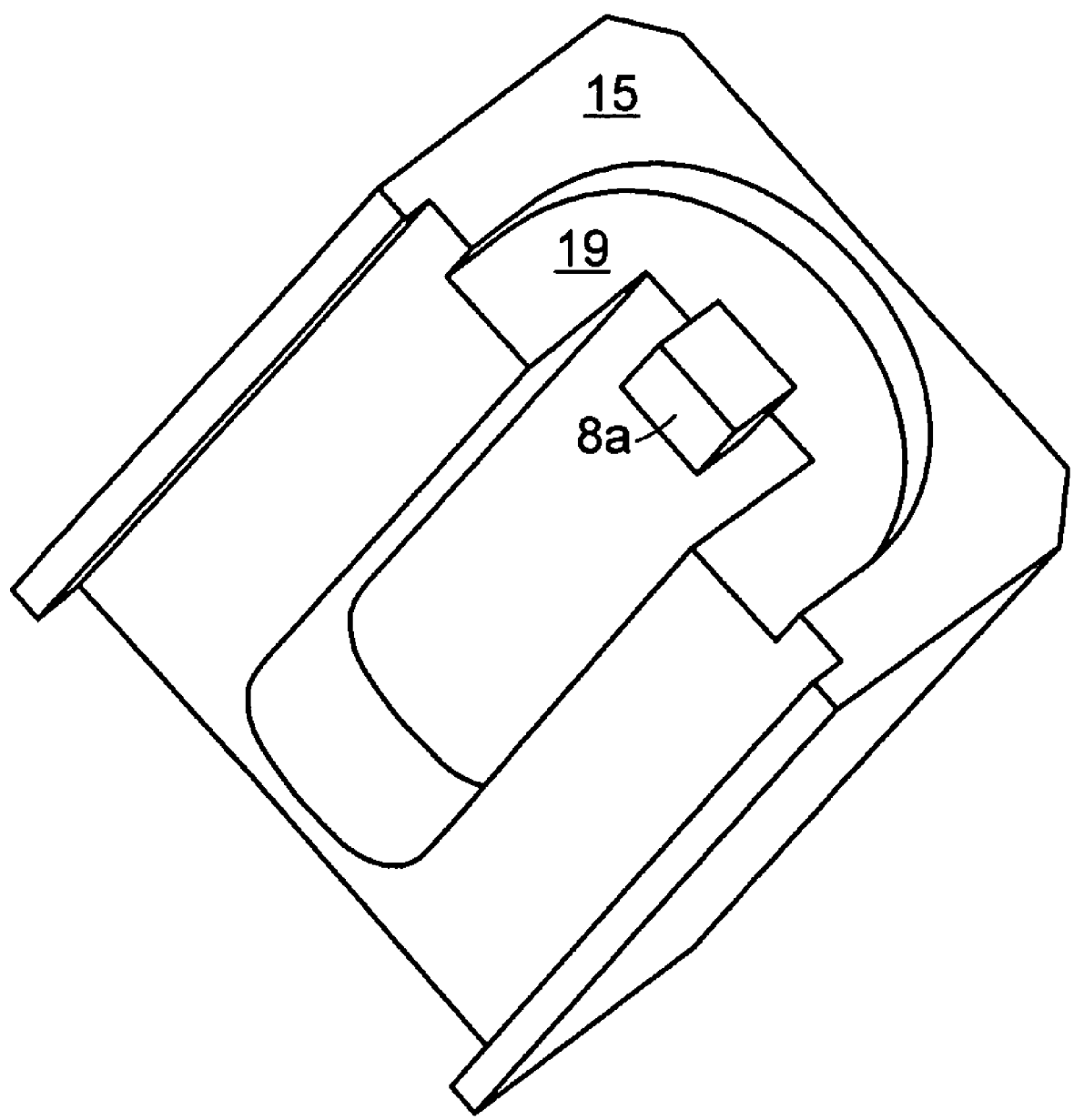
FIG. 4 illustrates an upper housing portion of an optical assembly in accordance with a further aspect of the invention.

The housing 13 may optionally include provision for holding one or more components, such as one or more of the above-described optical components (e.g., optical fibers, lenses such as ball lenses, filters, and optical isolators). Such a structure may allow for a package having a smaller footprint and/or provide improved manufacturability. FIG. 4, for example, illustrates an upper housing portion 15 in which a permanent magnet 8a, which forms a portion of an optical isolator, has been incorporated. One may additionally or optionally include the garnet crystal 8b (see FIGS. 2 and 3) of the optical isolator and/or multiple isolator magnets in the housing.

The optical ferrule receptacle 21 is provided for optically and mechanically mating to an optical fiber connector (not shown) containing an optical fiber or fiber stub. The optical fiber connector is attached to an optical fiber pigtail. Optical ferrule receptacle 21 is typically made of a metal or plastic on the outside, and typically contains a split ceramic sleeve to align with the connector. The optical receptacle may contain a double sided polished ferrule stub with a length of optical fiber in it, such as is commercially available, for example, from Kyocera Corporation. The optical receptacle may include a wick stop 27 for preventing excess bonding agent from entering the optical path. As illustrated, the wick stop may take the form of a closed groove in the face of the optical receptacle between the mating region and the optical path. While the illustrated wick stop 27 is circular, other geometries may be employed.

Connection of the housing 15 to the optical ferrule receptacle 21 is facilitated with a bonding agent. Suitable bonding agents include, for example, epoxies such as UV curing, thermal curing, and dual cure epoxies, and solders. Beneficially, the bonding agent may be kept out of the optical path of the assembly. In this way, bonding agents that would otherwise be unusable due, for example, to optical loss issues, may be employed. Application of the bonding agent may be controlled such that it may be symmetrically dispensed between the mating region 19 of the housing 15 and the mating region 30 of the optical receptacle assembly 21. The symmetrical relationship between the housing and optical receptacle mating regions minimizes variations in shrink and swelling of the bonding agent during cure and due to environmental exposure, resulting in minimal impact on the alignment to the optical bench 3.

What is claimed is:

1. An optical assembly, comprising:
   an optical bench comprising an optoelectronic component affixed to a substrate;
   a housing in which the optical bench is disposed, the housing comprising a first mating region;
   an optical ferrule receptacle for optically coupling the optical bench with an optical fiber, the optical ferrule receptacle comprising a second mating region, wherein the housing and the optical ferrule receptacle are mated with each other at the first and second mating regions; and
   a flex circuit attached to the optical bench wherein the flex circuit is disposed in contact with an interior surface of the housing for relieving strain in the flex circuit.

2. The optical assembly of claim 1, wherein the optical bench is a silicon optical bench comprising a silicon substrate.

3. The optical assembly of claim 1, wherein the optical bench is itself hentietically sealed.

4. The optical assembly of claim 1, wherein the interior surface of the housing includes a trench providing an air gap between the housing and a portion of the flex circuit.

5. The optical assembly of claim 1, wherein the interior surface of the housing includes alignment pins for passively locating the flex circuit.

6. The optical assembly of claim 1, further comprising a bonding agent for bonding the optical ferrule assembly to the housing, wherein the optical ferrrule assembly and/or the housing comprises a wick stop for preventing the bonding agent from entering the optical path during the bonding of the optical ferrule assembly to the housing.

7. The optical assembly of claim 1, wherein the housing comprises an upper housing portion connected to a lower housing portion, the upper and lower portions each comprising a portion of the first mating region.

8. The optical assembly of any of claim 1, wherein the first mating region is radially symmetrical to the second mating region.

9. The optical assembly of any of claim 1, further comprising an optical component or a portion thereof mounted to the housing.

10. The optical assembly of claim 1, wherein the interior surface of the housing comprises a compliant material thereon for supporting the flex circuit.

11. The optical assembly of claim 10, wherein the compliant material is a foam or an adhesive.

* * * * *